(12) United States Patent
Ishikura et al.

(10) Patent No.: US 10,703,189 B2
(45) Date of Patent: Jul. 7, 2020

(54) WATERPROOF STRUCTURE FOR BATTERY PACK

(71) Applicant: TOYOTA JIDOSHA KABUSHIKI KAISHA, Toyota-shi, Aichi-ken (JP)

(72) Inventors: Seiya Ishikura, Toyota (JP); Michiko Okuno, Ikeda (JP); Toshinori Kasai, Gifu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/291,615

(22) Filed: Mar. 4, 2019

(65) Prior Publication Data

US 2019/0270368 A1   Sep. 5, 2019

(30) Foreign Application Priority Data

Mar. 5, 2018   (JP) .................................. 2018-038448

(51) Int. Cl.
*B60K 1/04*   (2019.01)
*H01M 2/10*   (2006.01)
*B62D 25/20*   (2006.01)

(52) U.S. Cl.
CPC ............... *B60K 1/04* (2013.01); *B62D 25/20* (2013.01); *H01M 2/1077* (2013.01); *H01M 2/1083* (2013.01); *B60K 2001/0433* (2013.01)

(58) Field of Classification Search
CPC ............ B60K 1/04; B60K 2001/0433; H01M 2/1077; H01M 2/1083; B62D 25/20
See application file for complete search history.

(56) References Cited

U.S. PATENT DOCUMENTS

| 9,038,757 | B2 * | 5/2015 | Ogushi | B60K 1/04 |
| | | | | 180/68.5 |
| 9,821,645 | B2 * | 11/2017 | Hayashi | B60K 1/00 |
| 10,118,572 | B2 * | 11/2018 | Tsumura | B60K 1/04 |
| 10,173,511 | B2 * | 1/2019 | Hara | B60K 1/04 |
| 10,189,343 | B2 * | 1/2019 | Ogawa | B60K 1/04 |
| 10,399,455 | B2 * | 9/2019 | Sugitate | H01M 10/615 |
| 10,434,897 | B2 * | 10/2019 | Sugitate | B60K 1/04 |
| 2016/0243919 | A1 * | 8/2016 | Yamanaka | H01M 10/625 |
| 2016/0339774 | A1 * | 11/2016 | Hayashi | B60K 1/00 |
| 2017/0305250 | A1 * | 10/2017 | Hara | B60K 1/04 |
| 2018/0050606 | A1 * | 2/2018 | Sugitate | H01M 2/10 |
| 2018/0056894 | A1 * | 3/2018 | Tsumura | B60K 1/04 |
| 2018/0065458 | A1 * | 3/2018 | Ogawa | B60K 1/04 |
| 2018/0065459 | A1 * | 3/2018 | Tsumura | B60K 1/04 |
| 2018/0370344 | A1 * | 12/2018 | Hara | B60K 1/04 |
| 2019/0210483 | A1 * | 7/2019 | Sugitate | B60K 11/06 |
| 2019/0270368 | A1 * | 9/2019 | Ishikura | B60K 1/04 |

FOREIGN PATENT DOCUMENTS

| JP | 2008-125963 A | 6/2008 |
| JP | 2010-064687 A | 3/2010 |
| JP | 2015-137009 A | 7/2015 |
| JP | 2017-165231 A | 9/2017 |
| WO | 2008/062295 A1 | 5/2008 |
| WO | 2015/110861 A1 | 7/2015 |

* cited by examiner

*Primary Examiner* — Jacob B Meyer
(74) *Attorney, Agent, or Firm* — Sughrue Mion, PLLC

(57) ABSTRACT

Exposure of a battery pack to water is suppressed. The battery pack is mounted on an underbody. A floor carpet laid on the underbody in the vicinity of the battery pack has a wall portion formed of a peripheral edge portion along the battery pack rising upward.

4 Claims, 2 Drawing Sheets

WATERPROOF STRUCTURE FOR BATTERY PACK

This nonprovisional application is based on Japanese Patent Application No. 2018-038448 filed on Mar. 5, 2018 with the Japan Patent Office, the entire contents of which are hereby incorporated by reference.

BACKGROUND

Field

The present disclosure relates to a waterproof structure for a battery pack.

Description of the Background Art

Conventionally, as a measure against exposure of a battery pack mounted in a vehicle to water, a technique of accommodating the battery pack in a waterproof tray has been proposed (for example, see Japanese Patent Laying-Open No. 2015-137009).

SUMMARY

In mounting a battery pack in a vehicle, it is required to suppress exposure of the battery pack to water even in a case where it is impossible to adopt a waterproof tray due to a trade-off with other factors such as space, cost, or mass.

In the present disclosure, a waterproof structure capable of suppressing exposure of a battery pack to water is provided.

According to the present disclosure, a waterproof structure for a battery pack mounted in a vehicle is provided. The waterproof structure includes an underbody and a floor carpet. The underbody constitutes a bottom portion of the vehicle, and the battery pack is mounted thereon. The floor carpet is laid on the underbody in the vicinity of the battery pack. The floor carpet has a wall portion formed of a peripheral edge portion along the battery pack rising upward.

With such a configuration, the wall portion can hold back water accumulated on an upper surface of the floor carpet, and suppress entry of the water into the battery pack. Thereby, exposure of the battery pack to water can be suppressed.

In the waterproof structure described above, an upper edge of the wall portion is located above a lower surface of the battery pack. By defining the height of the wall portion in this manner, entry of the water beyond the wall portion into the battery pack can be suppressed more reliably.

In the waterproof structure described above, the floor carpet has a bent-back portion bent from an upper edge of the wall portion toward the battery pack. By forming the wall portion by bending the floor carpet twice, the peripheral edge portion of the floor carpet at which the wall portion is formed can have an improved rigidity.

The waterproof structure described above further includes a covering member covering a side surface of the battery pack. The wall portion is located closer to the battery pack than the covering member. With such a configuration, the peripheral edge portion of the floor carpet can be made invisible from an occupant riding in the vehicle, and the vehicle can have an improved design.

The foregoing and other objects, features, aspects, and advantages of the present disclosure will become more apparent from the following detailed description of the present disclosure when taken in conjunction with the accompanying drawings.

DESCRIPTION OF THE PREFERRED EMBODIMENTS

Figure 1:
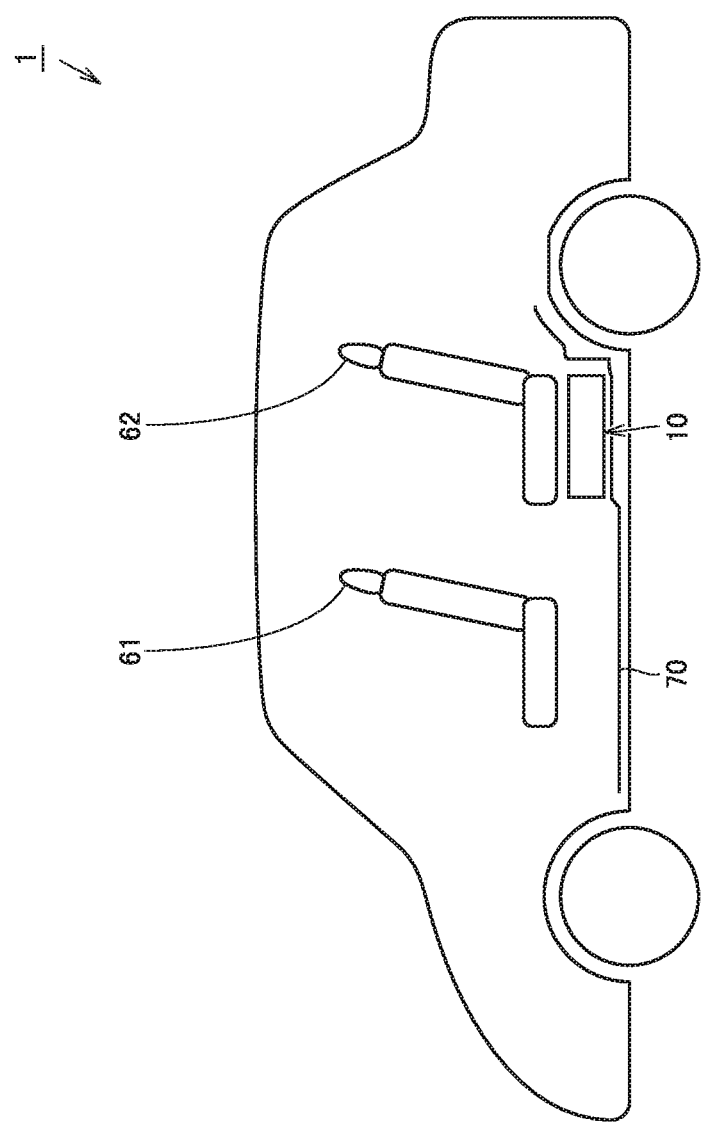
FIG. 1 is a schematic diagram showing a vehicle equipped with a waterproof structure for a battery pack in accordance with an embodiment.

Hereinafter, a waterproof structure for a battery pack in an embodiment will be described based on the drawings. In the embodiment described below, identical or substantially identical components will be designated by the same reference numerals, and an overlapping description will not be repeated.

FIG. 1 is a schematic diagram showing a vehicle 1 equipped with a waterproof structure for a battery pack 10 in accordance with an embodiment. Vehicle 1 in the embodiment may be a hybrid vehicle capable of traveling using motive power of at least one of a motor and an engine, or an electrically powered vehicle traveling using a drive force obtained by electrical energy. An interior of vehicle 1 is a space in which an occupant rides.

An underbody 70 shown in FIG. 1 constitutes a bottom portion of a main body of vehicle 1. A front seat 61 and a rear seat 62 are arranged in the interior of vehicle 1. Front seat 61 and rear seat 62 are arranged above underbody 70 with a space from underbody 70. The occupant riding in the vehicle sits in front seat 61 or rear seat 62.

Each of front seat 61 and rear seat 62 has a seat portion on which the occupant sits, a backrest portion which supports the back of the occupant, and a headrest which supports the head of the occupant. The seat portion is mounted on a seat frame 50 not shown in FIG. 1, and is supported from below by seat frame 50.

Underbody 70 is also equipped with battery pack 10. Battery pack 10 supplies electric power to a motor for driving the vehicle. The electric power generated by the motor through regenerative braking and the like is charged in battery pack 10. Battery pack 10 is mounted on underbody 70. Battery pack 10 is arranged below rear seat 62. Battery pack 10 is arranged between underbody 70 and rear seat 62.

Battery pack 10 is typically constituted by a secondary battery such as a nickel-hydrogen battery or a lithium ion battery, or a power storage device such as an electric double layer capacitor. Although not shown, battery pack 10 is configured to include a plurality of battery cells. The plurality of battery cells are stacked and electrically connected in series with one another.

Figure 2:
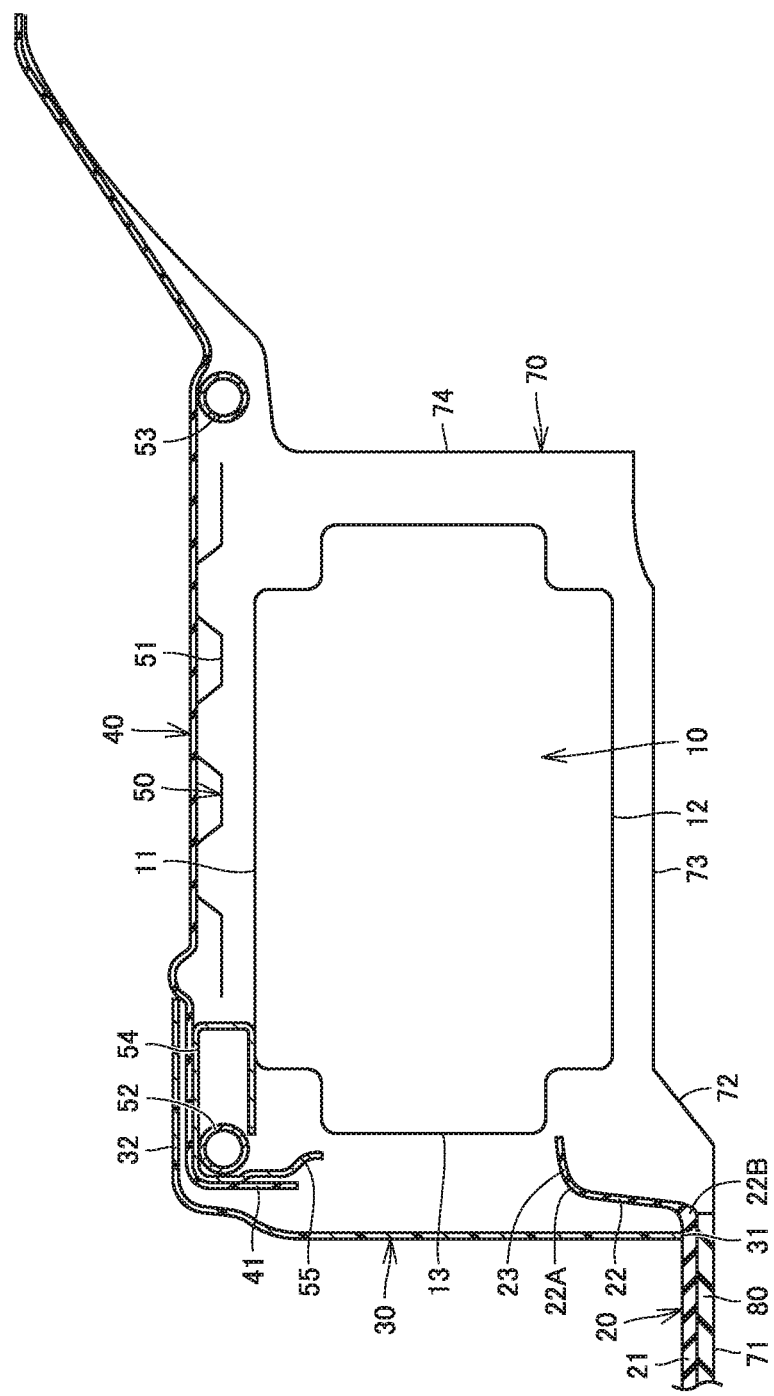
FIG. 2 is a schematic view showing the waterproof structure for the battery pack in accordance with the embodiment.

FIG. 2 is a schematic view showing the waterproof structure for battery pack 10 in accordance with the embodiment. As shown in FIG. 2, underbody 70 has a floor surface 71, an inclined surface 72, a bottom surface 73, and a rear wall surface 74.

Floor surface 71 constitutes a floor surface of the interior of vehicle 1. Floor surface 71 constitutes a floor surface under the feet of the occupant sitting in rear seat 62. Bottom surface 73 constitutes a bottom surface of an accommodation space which accommodates battery pack 10 therein, and rear wall surface 74 constitutes a rear wall surface of the accommodation space. Bottom surface 73 is located above and behind floor surface 71. Floor surface 71 and bottom surface 73 extend substantially parallel to each other. Inclined surface 72 is a surface connecting floor surface 71 and bottom surface 73. Inclined surface 72 is inclined relative to floor surface 71 and bottom surface 73 to proceed upward as it proceeds rearward.

Battery pack 10 is arranged above bottom surface 73 of underbody 70, and is arranged in front of rear wall surface 74 of underbody 70. Bottom surface 73 of underbody 70 is provided with a support structure not shown, and battery pack 10 is mounted on bottom surface 73 of underbody 70 via the support structure. Battery pack 10 is supported by bottom surface 73 of underbody 70.

Battery pack 10 has an upper surface 11 facing upward, a lower surface 12 facing downward, and a front side surface 13 facing forward. Lower surface 12 of battery pack 10 faces bottom surface 73 of underbody 70 with a gap therebetween.

A floor carpet 20 is laid on underbody 70 in the vicinity of battery pack 10. More specifically, floor carpet 20 is laid to cover floor surface 71 of underbody 70 located in front of battery pack 10. Floor carpet 20 has a carpet body portion 21 laid on floor surface 71. Carpet body portion 21 extends substantially parallel to floor surface 71. Carpet body portion 21 is laid under the feet of the occupant sitting in rear seat 62.

Floor carpet 20 has a wall portion 22 formed of a peripheral edge portion thereof rising upward. More specifically, wall portion 22 is formed by bending the peripheral edge portion along battery pack 10 of floor carpet 20 in a direction away from floor surface 71 relative to carpet body portion 21. Wall portion 22 extends substantially perpendicular to carpet body portion 21. Wall portion 22 extends substantially parallel to an up/down direction of vehicle 1. The angle formed between the direction in which carpet body portion 21 extends and the direction in which wall portion 22 extends is, for example, more than or equal to 70° and less than or equal to 110°.

Wall portion 22 has an upper edge 22A and a lower edge 22B. Wall portion 22 is connected to carpet body portion 21 at lower edge 22B. By bending floor carpet 20 at lower edge 22B, wall portion 22 bent back relative to carpet body portion 21 is formed. Wall portion 22 shown in FIG. 2 extends to be inclined relative to the up/down direction of vehicle 1, to proceed rearward as it proceeds from lower edge 22B to upper edge 22A, that is, as it approaches battery pack 10.

Floor carpet 20 also has a bent-back portion 23. By bending floor carpet 20 at upper edge 22A of wall portion 22, bent-back portion 23 bent back relative to wall portion 22 is formed. Wall portion 22 is connected to bent-back portion 23 at upper edge 22A. Floor carpet 20 is bent twice along upper edge 22A and lower edge 22B in the peripheral edge portion, and wall portion 22 and bent-back portion 23 are formed by these two bendings.

Bent-back portion 23 extends substantially perpendicular to wall portion 22. Bent-back portion 23 extends substantially parallel to carpet body portion 21. Bent-back portion 23 extends substantially parallel to a front/rear direction of vehicle 1. The angle formed between the direction in which wall portion 22 extends and the direction in which bent-back portion 23 extends is, for example, more than or equal to 70° and less than or equal to 110°. Bent-back portion 23 shown in FIG. 2 extends to be inclined relative to the front/rear direction of vehicle 1, to proceed upward as it proceeds rearward from upper edge 22A of wall portion 22, that is, as it approaches battery pack 10.

Bent-back portion 23 is bent rearward relative to wall portion 22. Bent-back portion 23 is bent from upper edge 22A of wall portion 22 toward battery pack 10. A leading portion of the peripheral edge portion of floor carpet 20 faces battery pack 10.

Upper edge 22A of wall portion 22 is located above lower surface 12 of battery pack 10. Bent-back portion 23 shown in FIG. 2 is arranged above upper edge 22A of wall portion 22, and thus bent-back portion 23 is entirely located above lower surface 12 of battery pack 10.

An absorption layer 80 is provided between floor carpet 20 and floor surface 71 of underbody 70. Absorption layer 80 is formed of a material excellent in water absorption, such as felt or sponge. An upper surface of absorption layer 80 is in surface contact with carpet body portion 21 of floor carpet 20. A lower surface of absorption layer 80 is in surface contact with an upper surface of floor surface 71 of underbody 70. Floor carpet 20 is laid on floor surface 71 of underbody 70 with absorption layer 80 interposed therebetween.

Front side surface 13 of battery pack 10 is covered with a plate-like interior trim 30. Interior trim 30 has a function as a covering member in the embodiment for covering front side surface 13 constituting a portion of side surfaces of battery pack 10. Interior trim 30 is arranged in front of battery pack 10, with a space from front side surface 13 of battery pack 10 in the front/rear direction of vehicle 1. Front side surface 13 of battery pack 10 faces interior trim 30 with a gap therebetween.

Wall portion 22 of floor carpet 20 is partially joined to interior trim 30. For example, wall portion 22 can be joined to interior trim 30 by inserting a pin not shown through wall portion 22 and fixing it to interior trim 30.

Lower edge 22B of wall portion 22 is arranged behind interior trim 30. Lower edge 22B of wall portion 22 is arranged between interior trim 30 and battery pack 10 in the front/rear direction of vehicle 1. Lower edge 22B of wall portion 22 is located closer to battery pack 10 than interior trim 30. Floor carpet 20 is bent to rise upward at a position closer to battery pack 10 than interior trim 30, and thus wall portion 22 is entirely located closer to battery pack 10 than interior trim 30.

A lower end portion 31 of interior trim 30 abuts on an upper surface of carpet body portion 21 of floor carpet 20. Carpet body portion 21 and absorption layer 80 are sandwiched between lower end portion 31 of interior trim 30 and floor surface 71 of underbody 70. Interior trim 30 is arranged in contact with floor carpet 20 with no gap therebetween when viewed macroscopically, or is arranged with a minute gap from floor carpet 20.

Interior trim 30 has an upper edge portion bent rearward, and an attachment portion 32 is formed by this bending. Attachment portion 32 extends along the front/rear direction of vehicle 1. Attachment portion 32 is attached to seat frame 50 described later in detail, and thereby interior trim 30 is held by seat frame 50.

Seat frame 50 is arranged above battery pack 10. The seat portion of rear seat 62 is mounted on an upper surface of seat frame 50. A lower surface of seat frame 50 faces underbody 70. Seat frame 50 is arranged above underbody 70 with a space between its lower surface and underbody 70. Seat frame 50 constitutes a top surface of the accommodation space which accommodates battery pack 10 therein.

Seat frame 50 shown in FIG. 2 has a frame body portion 51, a front frame portion 52, a rear frame portion 53, and a reinforcement portion 54. Front frame portion 52 and rear frame portion 53 constitute a portion of a pipe-like frame member constituting an outer edge of seat frame 50. Front frame portion 52 and rear frame portion 53 extend in a right/left direction of vehicle 1, and are provided in parallel to each other with a space therebetween in the front/rear direction of vehicle 1. Frame body portion 51 is a plate-like member fixed to an inner edge of the frame member described above. Frame body portion 51 has a corrugated shape including alternately arranged ridge shapes and groove shapes extending in the right/left direction of vehicle 1, and thereby the rigidity of frame body portion 51 is improved.

Reinforcement portion 54 is arranged to surround front frame portion 52, and improves the rigidity of seat frame 50 by reinforcing a front edge portion of seat frame 50. Attachment portion 32 at the upper edge portion of interior trim 30 is attached to reinforcement portion 54. By attaching interior trim 30 to reinforcement portion 54 having a high rigidity, the strength of a structure for attaching interior trim 30 is enhanced.

A portion of reinforcement portion 54 covering front frame portion 52 from the front hangs down below front frame portion 52, forming a hanging-down portion 55. Hanging-down portion 55 extends rearward from a forefront end of reinforcement portion 54. Hanging-down portion 55 has a schematic shape inclined relative to the front/rear direction of vehicle 1 such that it extends rearward and approaches battery pack 10 as it proceeds to a lower end thereof. The lower end of hanging-down portion 55 is located below upper surface 11 of battery pack 10.

A rear carpet 40 is laid on the upper surface of seat frame 50. Rear carpet 40 is arranged between seat frame 50 and the seat portion of rear seat 62 (FIG. 1). Rear carpet 40 covers frame body portion 51, front frame portion 52, and rear frame portion 53 of seat frame 50 from above.

A front edge portion of rear carpet 40 is bent to cover reinforcement portion 54 of seat frame 50 from the front, and thereby a bent portion 41 is formed. Bent portion 41 extends downward along the up/down direction of vehicle 1. A lower end of bent portion 41 is located below upper surface 11 of battery pack 10.

Bent portion 41 is arranged in a range in which floor carpet 20 exists in the front/rear direction of vehicle 1. When floor carpet 20 and rear carpet 40 are viewed in plan view, bent portion 41 is arranged at a position overlapping with floor carpet 20, more specifically, a position overlapping with bent-back portion 23. When rear carpet 40 and battery pack 10 are viewed in plan view, bent portion 41 is arranged at a position not overlapping with battery pack 10.

Rear carpet 40 having bent portion 41 constitutes an umbrella structure which spreads to cover battery pack 10 like an umbrella. Since rear carpet 40 having the umbrella structure can block water dropping from above onto battery pack 10, rear carpet 40 suppresses the water dropping from above from falling on battery pack 10. The water flowing downward from bent portion 41 drops onto bent-back portion 23 of floor carpet 20. As described above, bent-back portion 23 has a shape inclined to proceed upward as it approaches battery pack 10. The water dropping onto bent-back portion 23 flows in a direction away from battery pack 10 (direction toward the front of vehicle 1). Thereby, entry of the water into battery pack 10 is suppressed.

Rear carpet 40 further extends rearward beyond rear frame portion 53 constituting a rear edge portion of seat frame 50, to widely cover an upper surface of underbody 70 behind rear seat 62. Underbody 70 has a schematic shape inclined relative to the front/rear direction and the up/down direction of vehicle 1 such that it extends upward as it proceeds rearward from an upper edge of rear wall surface 74. Rear carpet 40 has a schematic shape inclined relative to the front/rear direction and the up/down direction of vehicle 1 such that it extends upward as it proceeds rearward, along underbody 70, behind rear seat 62.

In the waterproof structure for battery pack 10 having the configuration described above, as shown in FIG. 2, floor carpet 20 laid on underbody 70 in the vicinity of battery pack 10 has wall portion 22 formed of the peripheral edge portion along battery pack 10 rising upward.

When the occupant of vehicle 1 spills water in the interior or rain falls with a window of vehicle 1 being left open and rain water enters the interior, the water may reach carpet body portion 21 of floor carpet 20. In the embodiment, floor carpet 20 has wall portion 22, and a water stop structure using wall portion 22 to hold back the water accumulated on the upper surface of carpet body portion 21 is formed. This can suppress entry of the water into battery pack 10, and thus can suppress exposure of battery pack 10 to water.

In addition, as shown in FIG. 2, upper edge 22A of wall portion 22 is located above lower surface 12 of battery pack 10. By defining the height of wall portion 22 in this manner, entry of the water from the upper surface of carpet body portion 21, beyond wall portion 22, into battery pack 10 can be suppressed more reliably.

In addition, as shown in FIG. 2, floor carpet 20 has bent-back portion 23 bent from upper edge 22A of wall portion 22 toward battery pack 10. By forming wall portion 22 by bending floor carpet 20 twice at two positions, that is, lower edge 22B and upper edge 22A of wall portion 22, the peripheral edge portion of floor carpet 20 at which wall portion 22 is formed can have an improved rigidity.

When water enters the accommodation space of battery pack 10 from behind, the water flows forward through rear wall surface 74, bottom surface 73, and inclined surface 72 of underbody 70 in order, reaches absorption layer 80 between floor carpet 20 and floor surface 71, and is absorbed by absorption layer 80. Since floor carpet 20 has bent-back portion 23, splashing of the water which has reached wall portion 22 from behind is suppressed. This can more reliably suppress exposure of battery pack 10 to the splashing water.

In addition, as shown in FIG. 2, wall portion 22 is located closer to battery pack 10 than interior trim 30 covering front side surface 13 of battery pack 10 from the front. When viewed from the front, wall portion 22 is covered with interior trim 30, and is configured such that wall portion 22 is invisible from the interior of vehicle 1. By making the peripheral edge portion of floor carpet 20 invisible from the occupant riding in vehicle 1 and providing interior trim 30 as a design surface, vehicle 1 can have an improved design.

By forming a labyrinth structure for lengthening an entry route of the water which attempts to enter battery pack 10 from carpet body portion 21, between interior trim 30 and wall portion 22, entry of the water into battery pack 10 can be suppressed more reliably.

In the description of the embodiment, the characteristic feature of floor carpet 20 in the vicinity of battery pack 10 arranged below rear seat 62 has been described. Also in a case where battery pack 10 is arranged below front seat 61 (FIG. 1) or a third-row seat of vehicle 1, the effect of suppressing exposure of battery pack 10 to water can be similarly obtained by configuring floor carpet 20 to have wall portion 22.

The embodiment has described an example where, of underbody 70, bottom surface 73 below battery pack 10 is located above floor surface 71 on which floor carpet 20 is laid. The shape of underbody 70 is not limited to this example. For example, also in a case where a recessed bottom surface formed in underbody 70 has a function as bottom surface 73 on which battery pack 10 is mounted, and bottom surface 73 is located below floor surface 71, the effect of suppressing exposure of battery pack 10 to water can be similarly obtained by configuring floor carpet 20 in the vicinity of battery pack 10 to have wall portion 22.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A waterproof structure for a battery pack mounted in a vehicle, comprising:
   an underbody which constitutes a bottom portion of the vehicle and on which the battery pack is mounted;
   a floor carpet laid on, the underbody in vicinity of the battery pack;
   a rear carpet disposed at a rear of the floor carpet; and
   a covering member covering a side surface of the battery pack,
   wherein the floor carpet has a wall portion formed at a peripheral edge portion of the floor carpet rising upward along the battery pack, and the battery pack and the wall portion are within a space defined by the underbody, the rear carpet and the covering member.

2. The waterproof structure for the battery pack according to claim 1, wherein an upper edge of the wall portion is located above a lower surface of the battery pack.

3. The waterproof structure for the battery pack according to claim 1, wherein the floor carpet has a bent-back portion bent from an upper edge of the wall portion toward the battery pack.

4. The waterproof structure for the battery pack according to claim 1, wherein
   the wall portion is located closer to the battery pack than the covering member.

* * * * *